(12) United States Patent
Goldszmidt et al.

(10) Patent No.: US 8,078,913 B2
(45) Date of Patent: Dec. 13, 2011

(54) AUTOMATED IDENTIFICATION OF PERFORMANCE CRISIS

(75) Inventors: Moises Goldszmidt, Palo Alto, CA (US); Peter Bodik, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 186 days.

(21) Appl. No.: 12/473,900

(22) Filed: May 28, 2009

(65) Prior Publication Data
US 2010/0306597 A1 Dec. 2, 2010

(51) Int. Cl.
*G06F 11/00* (2006.01)
(52) U.S. Cl. ......... 714/26; 714/5.1; 714/47.1; 714/47.3; 702/185; 702/186
(58) Field of Classification Search .................... 714/26, 714/47, 5.1, 47.1, 47.3; 702/185, 186
See application file for complete search history.

(56) References Cited

U.S. PATENT DOCUMENTS

| | | | |
|---|---|---|---|
| 6,327,677 B1 * | 12/2001 | Garg et al. ............... | 714/37 |
| 6,748,416 B2 | 6/2004 | Carpenter et al. | |
| 7,184,935 B1 | 2/2007 | Cohen et al. | |
| 7,801,703 B2 * | 9/2010 | Marvasti ............... | 702/186 |
| 2003/0110007 A1 | 6/2003 | McGee et al. | |
| 2006/0188011 A1 | 8/2006 | Goldszmidt et al. | |
| 2008/0126881 A1 | 5/2008 | Bruckhaus | |
| 2008/0235283 A1 | 9/2008 | Turnball et al. | |
| 2008/0250497 A1 | 10/2008 | Mullarkey et al. | |
| 2010/0223499 A1 * | 9/2010 | Panigrahy et al. ............ | 714/19 |

OTHER PUBLICATIONS

Gabriela Cretu, "Hunting for Problems with Artemis", Microsoft Research, http://www.usenix.org/events/wasl08/tech/full_papers/cretu/cretu_html/.
Peter Bodik, "HiLighter: Automatically Building Robust Signatures of Performance Behavior for Small- and Large-Scale Systems", Nov. 22, 2008, RAD Lab, EECS Department, UC Berkeley, Microsoft Research, Silicon Valley, http://www.usenix.org/events/sysml08/tech/full_papers/bodik/bodik_html/.
Tarek F. Abdelzaher, "Performance Guarantees for Web Server End-Systems: A Control Theoretical Approach", IEEE Transactions on Parallel and Distributed Systems, 2002, http://citeseerx.ist.psu.edu/viewdoc/download?doi=10.1.1.16.8551&rep=rep1&type=pdf, IEEE Press, Piscataway, NJ, USA.
Marcos K. Aguilera, "Performance Debugging for Distributed Systems of Black Boxes", SOSP, Oct. 19-22, 2003, Bolton Landing, NY, USA.
Guillermo A. Alvarez, "Minerva: An Automated Resource Provisioning Tool for Large-Scale Storage Systems", ACM Transactions on Computer Systems (TOCS), Nov. 2001, vol. 19, Issue 4, pp. 483-518, ACM, New York, NY, USA.

(Continued)

*Primary Examiner* — Charles Ehne
(74) *Attorney, Agent, or Firm* — Vierra Magen Marcus & DeNiro LLP

(57) ABSTRACT

Methods for automatically identifying and classifying a crisis state occurring in a system having a plurality of computer resources. Signals are received from a device that collects the signals from each computer resource in the system. For each epoch, an epoch fingerprint is generated. Upon detecting a performance crisis within the system, a crisis fingerprint is generated consisting of at least one epoch fingerprint. The technology is able to identify that a performance crisis has previously occurred within the datacenter if a generated crisis fingerprint favorably matches any of the model crisis fingerprints stored in a database. The technology may also predict that a crisis is about to occur.

20 Claims, 8 Drawing Sheets

OTHER PUBLICATIONS

Paul Barham, "Magpie: Online Modelling and Performance-Aware Systems", Proceedings of the 9th conference on Hot Topics in Operating Systems, 2003, vol. 9, USENIX Association Berkeley, CA, USA.

Bayesian Network Classifier Toolbox, jBNC Toolkit, website, http://jbnc.sourceforge.net/.

John Binder, "Adaptive Probabilistic Networks with Hidden Variables", revised Mar. 24, 1997, http://citeseerx.ist.psu.edu/viewdoc/download?doi=10.1.1.53.3318&rep=rep1&type=pdf.

Anna Bartkowiak, "Neural Networks for Pattern Recognition", Lecture Notes, Jan. 26, 2005, pp. 1-56, Institute of Computer Science, University of Wroclaw, http://www.ii.uni.wroc.pl/~aba/teach/roadmap.pdf.

Mike Y. Chen, "Pinpoint: Problem Determination in Large, Dynamic Systems", Power Point. http://www.cs.rutgers.edu/~ryder/oosem05/lectures/Pinpoint-Ophelia.pdf.

Mike Y. Chen, "Path-Based Failure and Evolution Management", Proceedings of the 1st conference on Symposium on Networked Systems Design and Implementation, 2004, pp. 23-23, USENIX Association Berkeley, CA, USA.

David D. Clark, "A Knowledge Plane for the Internet", SIGCOMM, Aug. 25-29, 2003, ACM, Karlsruhe, Germany.

Carl Czajkowski, "Grid Information Services for Distributed Resource Sharing", Proceedings of the 10th IEEE International Symposium on High-Performance Distributed Computing, 2001, p. 181, IEEE Computer Society Washington, DC, USA.

Ronald P. Doyle, "Model-Based Resource Provisioning in a Web Service Utility", Proceedings of the 4th conference on USENIX Symposium on Internet Technologies and Systems, 2003, p. 5, USENIX Association Berkeley, CA, USA.

Richard O. Duda, "Pattern Classification and Scene Analysis", 1973, pp. 482, Wiley-Interscience, New York, NY, USA, http://ieeexplore.ieee.org/stamp/stamp.jsp?arnumber=1100577&isnumber=24138.

Armando Fox, "Self-Repairing Computers", Scientific American Magazine, Jun. 2003, 8 pages, http://www.sciamdigital.com/index.cfm?fa=Products.ViewIssuePreview&ARTICLEID_CHAR=08B277E7-FBF6-D7D6-79555B73B319013F.

Nir Friedman, "Bayesian Network Classifiers", Machine Learning, 1997, pp. 131-163, vol. 29, Issue 2-3, Kluwer Academic Publishers Hingham, MA, USA.

Nir Friedman, "Sequential Update of Bayesian Network Structure", Proceedings of the 13th Conference on Uncertainty in Artificial Intelligence, 1997, http://www.cs.huji.ac.il/~nir/Papers/FrG4.pdf.

Pankaj K. Garg, "Web Transaction Analysis and Optimization", Software Technology Laboratory, HP Laboratories Palo Alto, Feb. 28, 2002, http://www.hpl.hp.com/techreports/2002/HPL-2002-45.pdf.

Trevor Hastie, "The Elements of Statistical Learning", http://mail.ustc.edu.cn/~fygood/papers/ms/Statistical%20Learning%20for%20Statisticians.pdf.

David Heckerman, "Learning Bayesian Networks: The Combination of Knowledge and Statistical Data", Technical Report, MSR-TR-94-09, Mar. 1994, pp. 1-53, http://citeseerx.ist.psu.edu/viewdoc/download?doi=10.1.1.30.7910&rep=rep1&type=pdf.

Ryan Huebsch, "Querying the Internet with PIER", Proceedings of the 29th VLDB Conference, 2003, 12 pages, Berlin, Germany.

Ross Ihaka, "R: A Language for Data Analysis and Graphics", Journal of Computational and Graphical Statistics, 1996, pp. 299-314, vol. 5, No. 3.

Jeffrey O. Kephart, "The Vision of Autonomic Computing", IEEE, 2003, pp. 41-50, vol. 36, Issue 1, IEEE Computer Society Press Los Alamitos, CA, USA.

Michael Mesnier, "File Classification in Self-Storage Systems", Proceedings of the 1st International Conference on Autonomic Computing, May 2004, 8 pages, New York, NY, USA.

David Mosberger, "httperf—A Tool for Measuring Web Server Performance", ACM SIGMETRICS Performance Evaluation Review, Dec. 1998, pp. 31-37, vol. 26, Issue 3, ACM New York, NY, USA.

J. Ross Quinlan, "C4.5 Programs for Machine Learning", Machine Learning, 1993, Morgan Kaufmann Publishers Inc., San Francisco, CA, USA.

David Gerard Sullivan, "Using Probabilistic Reasoning to Automate Software Tuning", Sep. 2003, 212 pages, Harvard University Cambridge, MA, USA.

Robbert Van Renesse, "Astrolabe: A Robust and Scalable Technology for Distributed System Monitoring, Management, and Data Mining", ACM Transactions on Computer Systems, 2003, pp. 164-206, vol. 21, Issue 2, ACM New York, NY, USA.

Mike Wawrzoniak, "Sophia: An Information Plane for Networked Systems", Planet Lab, ACM SIGCOMM Computer Communication Review, 2004, pp. 15-20, vol. 34, Issue 1, ACM New York, NY, USA.

\* cited by examiner

|  | Metric 1, Q1 | Metric 1, Q2 | Metric 1, Q3 | Metric 2, Q1 | Metric 2, Q2 | Metric 2, Q3 | Metric 3, Q1 | Metric 3, Q2 | Metric 3, Q3 | Metric 4, Q1 | Metric 4, Q2 | Metric 4, Q3 | Metric 5, Q1 | Metric 5, Q2 | Metric 5, Q3 |  | Metric 100, Q1 | Metric 100, Q2 | Metric 100, Q3 |
|---|---|---|---|---|---|---|---|---|---|---|---|---|---|---|---|---|---|---|---|
| T1 [1 | 15 | 25 | 8 | 27 | 56 | 2 | 37 | 99 | 10 | 15 | 19 | 4 | 12 | 37 | ... | 17 | 39 | 88] |
| T2 [1 | 22 | 88 | 1 | 17 | 78 | 8 | 54 | 37 | 18 | 33 | 44 | 9 | 16 | 67 | ... | 11 | 56 | 99] |
| T3 [8 | 89 | 77 | 1 | 55 | 66 | 3 | 44 | 55 | 19 | 77 | 39 | 2 | 88 | 22 | ... | 66 | 44 | 67] |

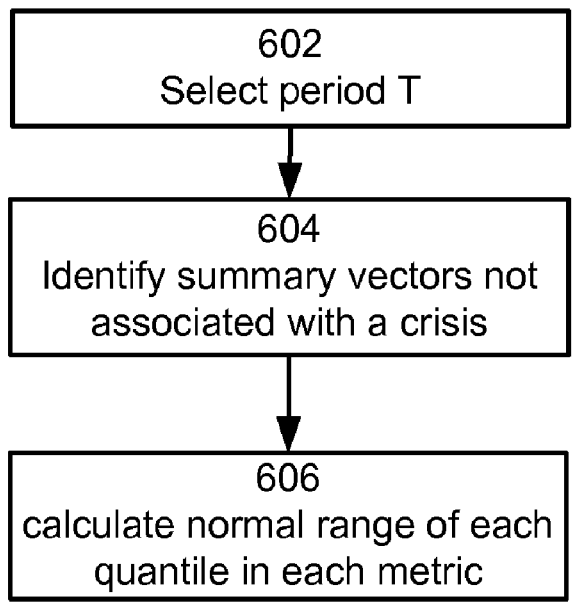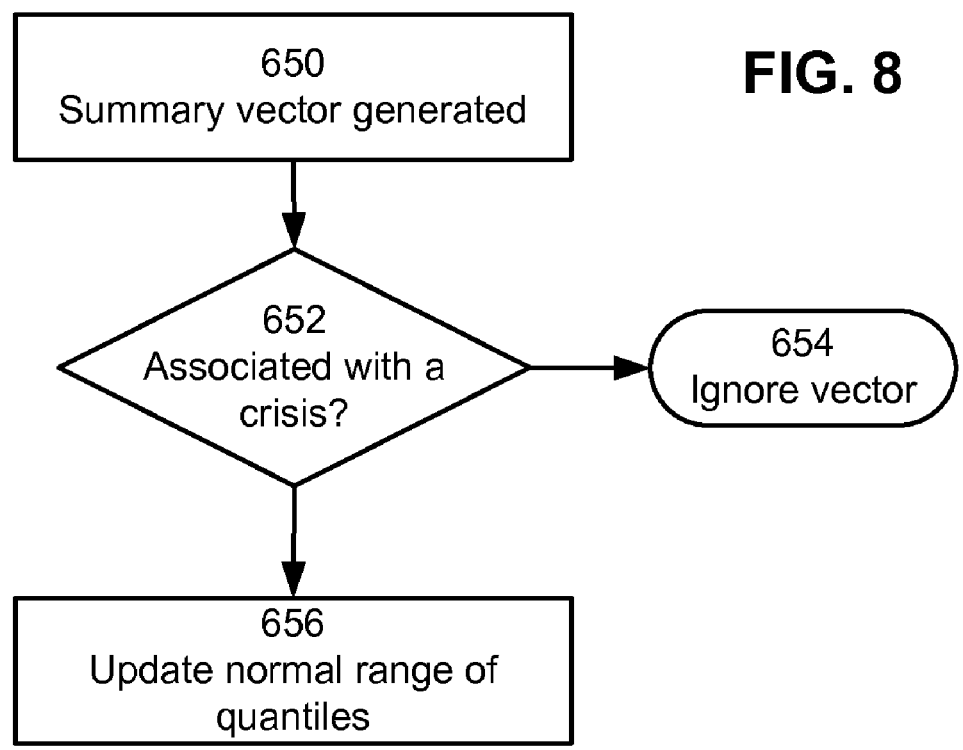

T1  [0 0 0  0 0 0  0 0 0  0 0 0  0 0 0 ... 1 1 1]

T2  [1 1 0  1 1 0  0 0 0  0 0 0  1 1 0 ... 0 0 0]

T3  [1 1 0  1 1 0  0 0 0  0 0 0  1 1 0 ... 0 0 0]

T4  [1 1 0  0 0 0  0 0 0  0 0 0  0 0 0 ... 1 1 1]

T5  [1 1 0  0 0 0  0 0 0  0 0 0  0 0 0 ... 0 0 0]

T6  [1 0 1  0 0 0  0 0 0  0 0 0  0 0 0 ... 0 1 1]

```
850
Feature selection and
classification
    ↓
852
Select most frequent metrics
```

|  | Metric 1, Q1 | Metric 1, Q2 | Metric 1, Q3 | Metric 2, Q1 | Metric 2, Q2 | Metric 2, Q3 | Metric 3, Q1 | Metric 3, Q2 | Metric 3, Q3 | Metric 4, Q1 | Metric 4, Q2 | Metric 4, Q3 | Metric 5, Q1 | Metric 5, Q2 | Metric 5, Q3 | ... | Metric 30, Q1 | Metric 30, Q2 | Metric 30, Q3 |
|---|---|---|---|---|---|---|---|---|---|---|---|---|---|---|---|---|---|---|---|
| T1 | [0 | 0 | 0 | 0 | 0 | 0 | 0 | 0 | 0 | 0 | 0 | 0 | 0 | 0 | 0 | ... | 1 | 1 | 1] |
| T2 | [1 | 1 | 0 | 1 | 1 | 0 | 0 | 0 | 0 | 0 | 0 | 0 | 1 | 1 | 0 | ... | 0 | 1 | 1] |
| T3 | [1 | 1 | 0 | 1 | 1 | 0 | 0 | 0 | 0 | 0 | 0 | 0 | 1 | 1 | 0 | ... | 0 | 0 | 0] |
| T4 | [1 | 1 | 0 | 0 | 0 | 0 | 0 | 1 | 0 | 0 | 0 | 0 | 0 | 0 | 0 | ... | 0 | 1 | 1] |
| T5 | [1 | 1 | 0 | 0 | 0 | 0 | 0 | 1 | 0 | 0 | 0 | 0 | 0 | 1 | 0 | ... | 0 | 1 | 1] |
| T6 | [1 | 0 | 1 | 0 | 0 | 0 | 0 | 1 | 0 | 0 | 0 | 0 | 0 | 1 | 0 | ... | 0 | 1 | 1] |

Crisis begins → T3

FIG. 13

```
880
Identify performance crisis
    ↓
882
Generate model crisis FP with
epoch FPs prior to crisis
    ↓
884
Augment model crisis FP with
epoch FPs generated during crisis
```

AUTOMATED IDENTIFICATION OF PERFORMANCE CRISIS

BACKGROUND OF THE TECHNOLOGY

Enterprise computing systems and networked enterprise computing systems continue to grow in scale and in the complexity of their components and interactions. Today's large-scale networked enterprise computing systems and services exhibit complex behaviors stemming from the interaction of workload, software structure, hardware, network traffic conditions, and system goals, such as service level objectives and agreements. Because of this considerable growth in both scale and complexity, performance issues are difficult to identify, forecast, and diagnose.

There are many commercial frameworks on the market for coordinated monitoring of the large-scale systems and services that can aggregate information from a variety of sources and present it to operators. However, the complexity of the data these systems and services collect and aggregate surpasses the ability of humans to decipher to allow timely and accurate diagnosis and response.

SUMMARY OF THE TECHNOLOGY

A system is disclosed that summarizes a variety of signals collected from computer resources operating within a datacenter and uses the signals to generate epoch fingerprints. Upon identifying a performance crisis within the system, a crisis fingerprint is generated consisting of at least one epoch fingerprint. The generated crisis fingerprint is compared against one or more crisis fingerprints stored in a database. The system identifies a crisis state upon a favorable match between a generated crisis fingerprint and one of the crisis fingerprints stored in a database.

If the performance crisis has occurred previously in the system, a repair alarm may be delivered to an operator. If the generated crisis fingerprint is not matched with a crisis fingerprint stored in the database, the system may deliver a diagnose alarm to the operator. Upon the operator diagnosing and restoring the system, the operator may annotate the crisis fingerprint prior to storing the crisis fingerprint in the database.

In one embodiment, the system summarizes the signals collected during an epoch to three quantiles per signal. The system tracks the historical performance of each quantile to determine a hot, cold and normal range of each quantile. Based on these hot, cold and normal value ranges, the quantiles are transformed into element values. Upon determining a subset of key signals, the system generates an epoch fingerprint.

Another aspect of the system is to predict when a performance crisis will occur prior to the actual crisis. In some embodiments, upon detecting a crisis, model crisis fingerprint is generated that consists is at least one epoch fingerprint prior to the performance crisis. The model crisis fingerprint is compared against the corresponding epoch fingerprints of the crisis fingerprints stored in the database. The comparison continues as the crisis evolves and as the crisis fingerprint is augmented with newly generated epoch fingerprints. In one embodiment, the matching continues unto there is a favorable match, using up to six epoch fingerprints. The epoch fingerprints in the crisis fingerprint generated prior to the performance crisis may indicate a state of the computer resources in the system leading up to the performance crisis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 depicts a flow chart of exemplary steps of calculating hot/cold thresholds.

FIG. 8 depicts a flow chart of exemplary steps of updating the hot/cold thresholds calculated in FIG. 7.

FIG. 11 depicts a flow chart of exemplary steps of determining relevant metrics.

FIG. 12 depicts exemplary epoch fingerprints.

FIG. 13 depicts a flow chart of exemplary steps of generating a crisis fingerprint.

DETAILED DESCRIPTION

Figure 1:
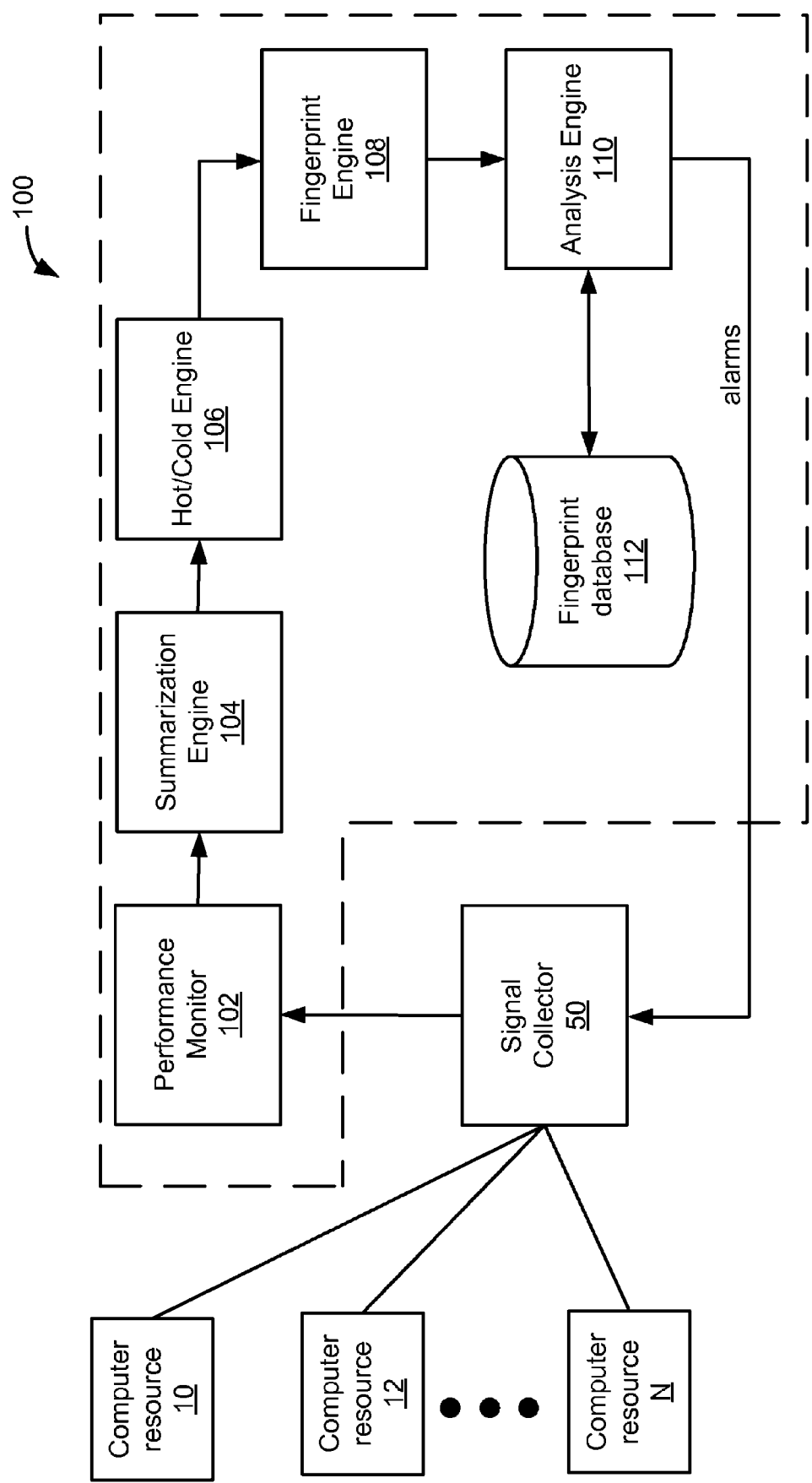
FIG. 1 depicts a block diagram of an exemplary diagnostic system.

A system is disclosed for automating recognition and identification of known performance crises, and predicting a performance crisis. The system uses signals collected from computer resources operating within a datacenter to generate fingerprint representations of the state of the computer resources. The system summarizes and captures a subset of the collected signals that do the best job of discriminating among different crisis.

The system generates epoch fingerprints during operation of the datacenter. Each epoch fingerprint represents a summary of the signals collected from the computer resources in the datacenter. The term "signal" is used herein to refer to a signal, an event indicator, a state of the computer resources within the datacenter during a given epoch (period of time), and the like. The term datacenter generally refers to a facility used to house one or more computer resources. A computer resource may include hardware, such as one or more hardware components. Examples of hardware components include processors, volatile and non-volatile memory, and hard disks. A computer resource may also include software components, such as one or more of applications, databases, operating systems, and networking software. A computer resource may also include a combination of hardware and software components. A computer resource may include a computer system or a group of computer systems, such as a server, a server group, or a router.

Epoch fingerprints are continuously generated as the datacenter operates to provide updated states of the datacenter, and are used to generate a crisis fingerprint upon detecting a performance crisis within the datacenter. A performance crisis refers to a performance problem, such as a fault of a computer resource, a failure of the computer resource, a deviation of the performance objectives of a resource or a group of resources, a misconfiguration of a computer resource or a group of resources, and/or an unexpected increase in the workload volume which is above the one for which the resources where designed to handle. An epoch fingerprint may be determined for the computer resources even when a crisis is not present in any of the computer resources, and may be used for describing normalcy states of the computer resource, such as when the computer resources are operating within predetermined parameters.

One or more of the predetermined parameters, for example, are determined from service level objectives (SLOs) or service level agreements (SLAs). The terms SLO and SLA are used interchangeably throughout the description. SLOs are parameters that should be met by a service, which may include one or more applications. For example, the parameters may include signals that are measured and compared to the parameters specified in the SLOs. An example of an SLO is average response time of requests to a service being less than 5 seconds. The response time is measured and compared to the 5-second threshold to determine whether there is a violation. A signal generally refers to any measurable features of the computer resource, such as server response time, pages served per time period, CPU utilization, memory utilization, disk utilization, bandwidth, and the like.

FIG. 1 illustrates an exemplary system 100 for identifying and predicting performance crises within a datacenter. The system includes a performance monitor 102, summarization engine 104, a hot/cold engine 106, a fingerprint engine 108, an analysis engine 110, and a database 112. The performance monitor 102 receives signals from a signal collector 50, which collects the signals from each of the computer resources 10, 12, ... N located within the datacenter.

In order to detect performance problems associated with a computer resource, an operator may sample several signals of each computer resource during predetermined intervals (referred to as an "epoch"). It is not uncommon to sample upwards of 100 signals for each computer resource. Collecting any number of signals per computer resource is within the scope of the technology described herein.

An operator of the datacenter may designate a subset of the sampled signals to be key performance indicators (KPIs) whose values form part of the definition of a contractual service-level agreement (SLA) for the application. An SLA typically specifies a threshold value for each KPI and the minimum fraction of computer resources that have to satisfy the requirement over a particular time interval. For example, an SLA might require that the end-to-end interactive response time be below a certain threshold value for 99.99% of all requests in any fifteen minute interval.

A performance crisis is defined as a prolonged violation of one or more specified SLAs. Recovery from the performance crisis involves taking the necessary actions to return the datacenter to an SLA-compliant state. If the operator can recognize that a performance crisis is of a previously-seen type, a known remedy can be applied, reducing overall recovery time. Conversely, if the operator can quickly determine that the performance crisis does not correlate to any previously seen incident, the operator can immediately focus on diagnosis and resolution steps, and record the result in case the performance crisis recurs in the future.

The signal collector 50 collects signals from the computer resources 10 ... N once per epoch—typically a few minutes. This time period is exemplary only, and is not intended to limit the scope of the technology described herein. The time period may be adjustable depending on the nature and use of the computer resources 10, 12 ... N. For the purpose of describing the technology only, each epoch will refer to a 15 minute interval.

The performance monitor 102 receives signals for each computer resource in the datacenter for each signal collected by the signal collector 50. A signal is the measurement of a particular characteristic of a program's or hardware's performance or efficiency. In some embodiments, the operator of the datacenter configures the signal collector 50 to collect signals from only a subset of the computer resources within the datacenter. Metric values are the measurements (raw data values) for each signal. Using an example of a datacenter having 300 computer resources and the signal collector 50 collecting 100 different signals per computer resource during an epoch, the performance monitor 102 receives 300 metric values per signal across 100 signals each epoch (e.g., 15 minutes). In other words, the performance monitor receives 30,000 metric values from the signal collector 50 every 15 minutes. These 30,000 metric values represent the state of the computer resources within the datacenter for the epoch.

The metric values received by the performance monitor 102 are delivered to the summarization engine 104. The summarization engine 104 reduces the number of metric values used to represent the state of the computer resources in the datacenter (which is currently 30,000 metric values). In some embodiments, the summarization engine 104 generates a summary vector that consists of three quantiles per signal. This reduces the number of metric values used to represent the state of the datacenter during an epoch from 30,000 metric values down to 300 metric values. More detail will be provided later describing how the summarization engine 104 generates these summary vectors.

The hot/cold engine 106 sets thresholds for hot, cold and normal ranges of each quantile, and continuously updates these thresholds as metric values are continuously collected from the computer resources in the datacenter. The hot/cold engine 106 also transforms each quantile in a summary vector into an element value. As a result, the hot/cold engine 106 transforms each summary vector generated by the summarization engine 104 into a summary vector containing at least one element value per signal. More details will be provided later describing how the hot/cold engine 106 determines and updates these thresholds, and transforms a summary vector.

The fingerprint engine 108 receives a transformed summary vector from the hot/cold engine 106 and generates an epoch fingerprint. An epoch fingerprint represents a state of the computer resources in the datacenter across a subset of relevant signals. An epoch fingerprint is generated every epoch, whether a crisis is present or not. Upon detecting a crisis, the fingerprint engine 108 generates a model crisis fingerprint. In some embodiments, a model crisis fingerprint consists of two epoch fingerprints generated prior to the start of the crisis. Any number of epoch fingerprints generated prior to the crisis may be included in the model crisis fingerprint. The model crisis fingerprint is augmented with additional epoch fingerprints. More details will be provided later describing how the fingerprint engine 108 generates epoch fingerprints and crisis fingerprints.

The database 112 stores previously generated crisis fingerprints. In one embodiment, each crisis fingerprint stored in the database 112 consists of six consecutive epoch fingerprints. However, depending on the size and nature of the datacenter, a crisis fingerprint may consist of any number of consecutive epoch fingerprints.

The analysis engine 110 receives a crisis fingerprint from the fingerprint engine 108 and compares the crisis fingerprint against each of the crisis fingerprints stored in the database 112. If a favorable match is found between the generated crisis fingerprint and a crisis fingerprint stored in the database 112, the analysis engine 110 recognizes that the performance crisis associated with generated new crisis fingerprint has previously occurred in the datacenter. At this point, the analysis engine 110 may send a repair alarm to the signal collector 50 identifying the performance crisis. The repair alarm may identify how to restore the datacenter to a non-crisis state. If there is no match, the analysis engine 110 may send a diagnose alarm to the operator, whereby the operator can annotate the generated crisis fingerprint upon restoring the operation of the datacenter and store the annotated crisis fingerprint in the database 112.

Figure 2:
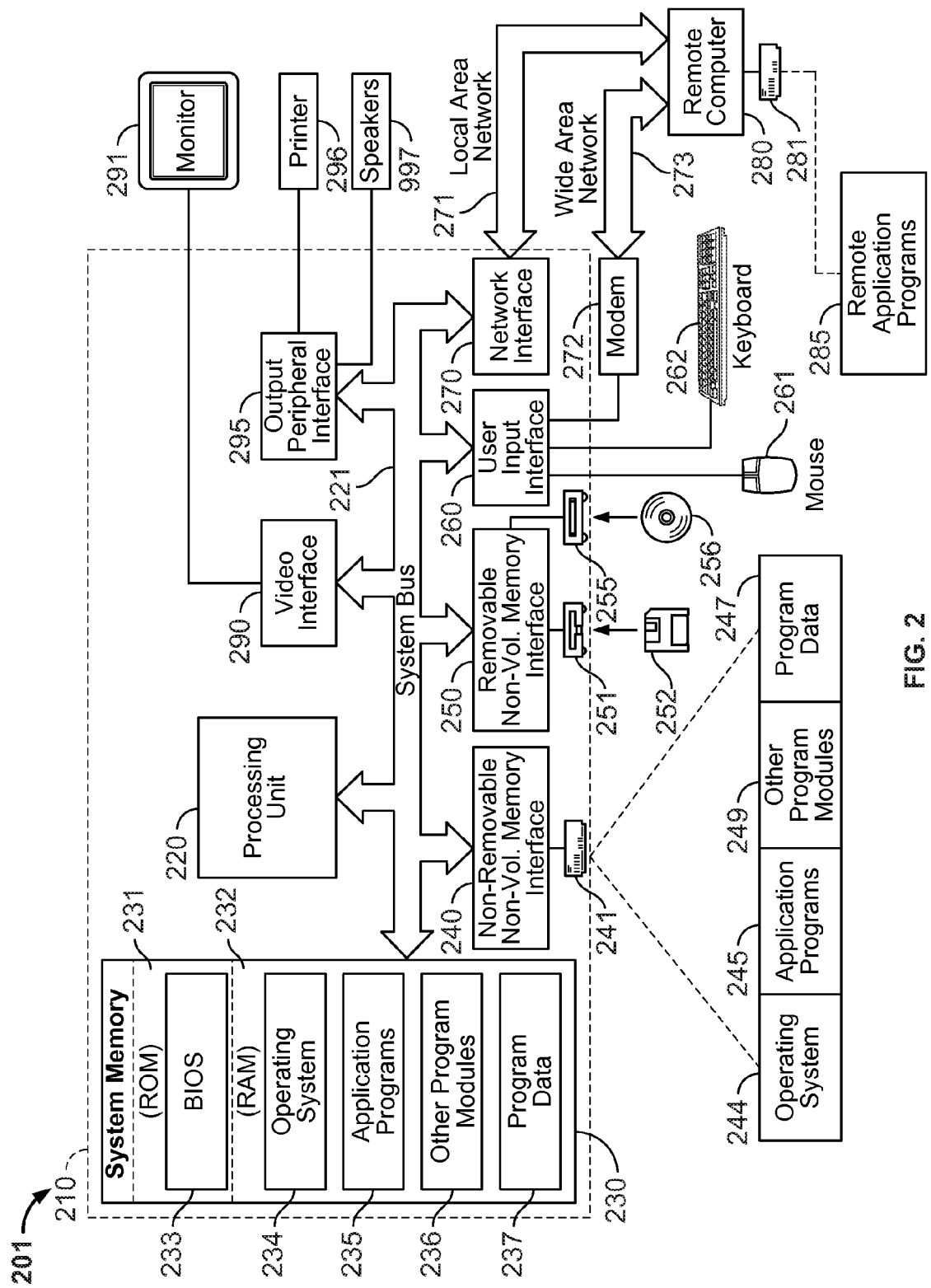
FIG. 2 depicts a block diagram of an exemplary computing system.

FIG. 2 illustrates an example of a suitable general computing environment that may be used as the performance monitor 102, the summarization engine 104, the hot/cold engine 106, the fingerprint engine 108, the analysis engine 110, and the database 112. The performance monitor 102, the summarization engine 104, the hot/cold engine 106, the fingerprint engine 108, the analysis engine 110, and the database 112 may also be implemented using one or more processing devices. The computing system environment 100 is only one example of a suitable computing environment and is not intended to suggest any limitation as to the scope of use or functionality of the technology. Neither should the computing environment 100 be interpreted as having any dependency or requirement relating to any one or combination of components illustrated in the exemplary operating environment 100.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc., that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the technology includes a general purpose computing device in the form of a computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data. By way of example, and not limitation, communication media includes wired media such as a wired network or direct-wired connection, and wireless media such as RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
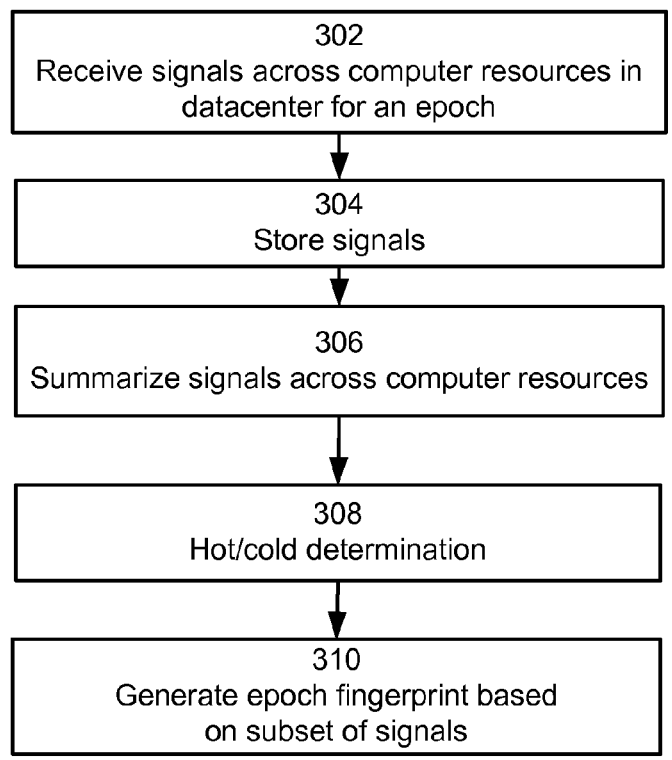
FIG. 3 depicts a flow chart of exemplary steps for generating epoch fingerprints.

FIG. 3 is a flow chart of exemplary steps of generating an epoch fingerprint. As discussed above, the system continuously generates epoch fingerprints for every epoch during which signals are collected across all computer resources in the datacenter. At step 302, the performance monitor 102 receives the signals from the signal collector 50 for a particular epoch. Using the exemplary datacenter above, the performance manager 102 receives 300 signals for each of the 100 signals every fifteen minutes. At step 304, the technology stores the signals received at step 302.

At step 306, the technology summarizes the signals. In some embodiments, the technology summarizes the signals with quantiles. In one embodiment, the technology summarizes the signals collected per signal with three quantiles. Any number of quantiles may be used to summarize the signals per signal.

Figures 5, 6:
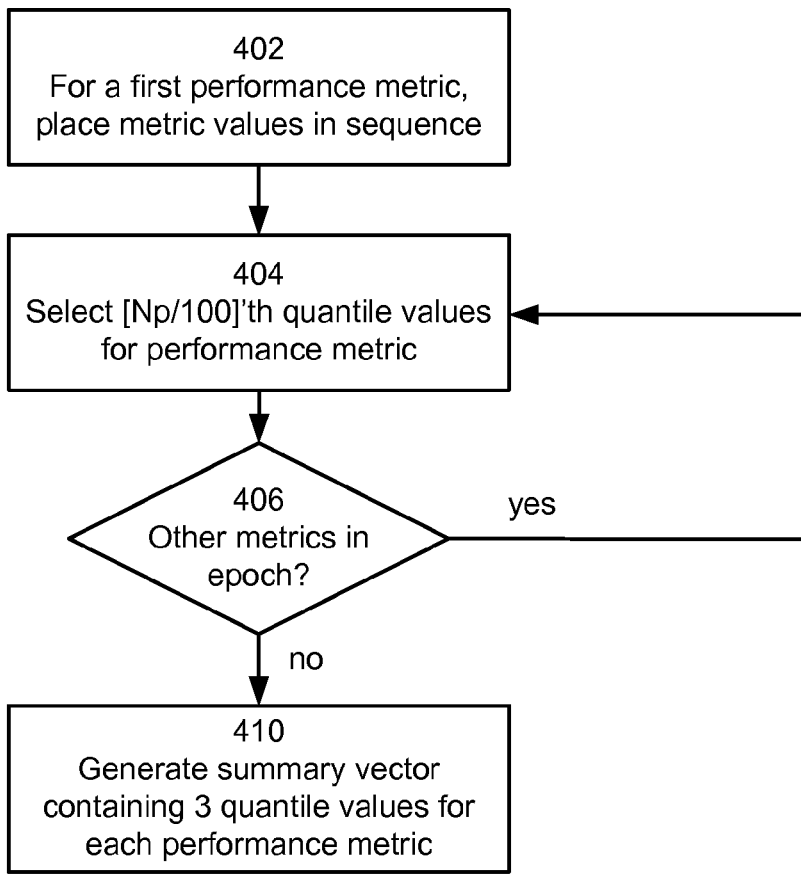
FIG. 5 depicts a flow chart of exemplary steps of generating a summary vector.
FIG. 6 depicts an exemplary summary vector.

FIGS. 5-6 provide additional detail of step 306. FIG. 5 illustrates exemplary steps of summarizing the signals with a summary vector. Using the exemplary datacenter above, 100 signals are collected from each computer resource in the datacenter during an epoch. At step 402, the technology, for a first signal, ranks the metric values in strict numerical sequence (e.g., ascending order). At step 404, the technology selects three quantiles to represent the metric values within the first signal. By way of example only, the technology calculates the p'th quantiles by selecting the [Np/100]'th value (the 100-quantiles are commonly referred to as percentiles) of the metric values after being ranked in order.

After calculating the three quantiles in step 404, the technology determines if there are additional signals in the vector, at step 406. Using the example provided above, the technology selects the next signal (Metric 2) in the vector during T1, and calculates the 25%, 50%, and 95% quantiles for the next signal, at step 404. The technology repeats step 404 until three quantiles are calculated for each of the 100 signals in the vector during T1. Once each and every signal has been summarized with three quantiles, the technology generates a summary vector containing three quantiles for each signal, at step 410.

FIG. 6 illustrates three exemplary summary vectors. Each summary vector is a vector of 3M elements (M is the number of signals being tracked). A first summary vector represents the state of the computer resources in the datacenter during epoch T1. The first summary vector summarizes the metric values in each of the 100 signals with three quantiles. FIG. 6 illustrates that the first signal (Metric 1) of the first summary vector contains a 25% quantile 1 (Metric1, Q1), a 50% quantile 15 (Metric1, Q2), and a 95% quantile 25 (Metric1, Q3). These three quantiles (1, 15, 25) summarize the original 300 metric values collected by the signal collector 50 during T1. The first summary vector, for the second signal (Metric2), contains a 25% quantile 8 (Metric2, Q1), a 50% quantile 27 (Metric2, Q2), and a 95% quantile 56 (Metric2, Q3). FIG. 6 illustrates that each of the 100 signals is summarized with 3 quantiles. FIG. 6 also illustrates a second and third summary vector, as sampled during epochs T2 and T3 respectively. The summary vectors during epochs T2 and T3 are also a summary of the metric 1-metric 100 using 3 quantiles per signal. As discussed above, the technology generates a summary vector for each epoch that the performance engine 102 receives metric values from the signal collector 50.

Returning to FIG. 3, the technology transforms each quantile in a summary vector into an element value, at step 308. An element value indicates whether a quantile in a summary vector is abnormally high (hot), abnormally low (cold), or normal, during the epoch. More detail about transforming each quantile into an element value will be provided with reference to FIGS. 7-9.

At step 310, the technology generates an epoch fingerprint based on each summary vector. An epoch fingerprint represents the state of the computer resources in the datacenter during an epoch for the subset of the signals that are most relevant for identifying a crisis. Additional details of determining a subset of relevant signals will be provided later with reference to FIGS. 11-12.

Figure 4:
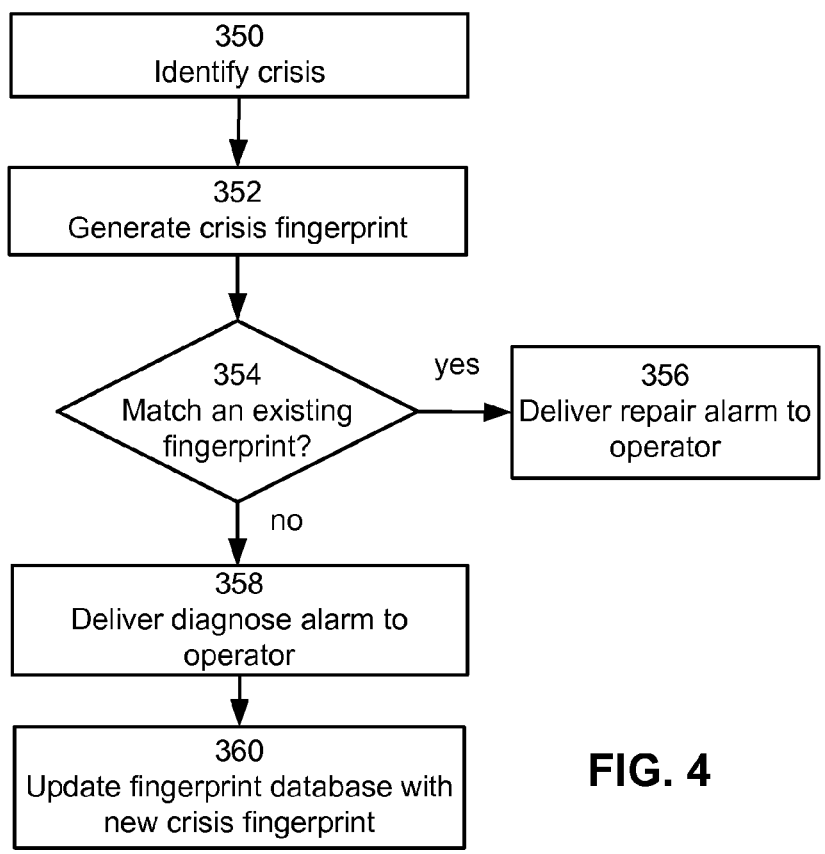
FIG. 4 depicts a flow chart of exemplary steps of identifying a crisis.

FIG. 4 illustrates exemplary steps for generating a crisis fingerprint and identifying if the performance crisis represented by the crisis fingerprint has previously occurred. At step 350, the technology identifies a performance crisis. In some embodiments, a performance crisis is declared by the signal collector 50 when ten percent (or more) of the computer resources in the datacenter violate any KPI of an SLA. In other embodiments, a performance crisis is declared by the signal collector 50 when twenty percent (or more) of the computer resources in the datacenter violate any KPI of an SLA. These percentages are exemplary, and are not intended to limit the scope of the technology described herein. Examples of KPIs that may be designated by the operator of the datacenter correlate to the average processing time in the front end, the second stage, and one of the post-processing stages. Other KPIs may be used to determine whether any of the computer resources is in violating of an SLA.

At step 352, the technology, the technology begins to model a crisis fingerprint. A crisis fingerprint refers to a fingerprint including one or more epoch fingerprints. In some embodiments, a crisis fingerprint includes at least one epoch fingerprint generates before the performance crisis was identified and at least two epoch fingerprints during the crisis. A crisis fingerprint may include any number of epoch fingerprints prior to the crisis and any number of epoch fingerprints during the crisis. FIGS. 12-13 provide additional detail of generating a crisis fingerprint.

Figure 14:
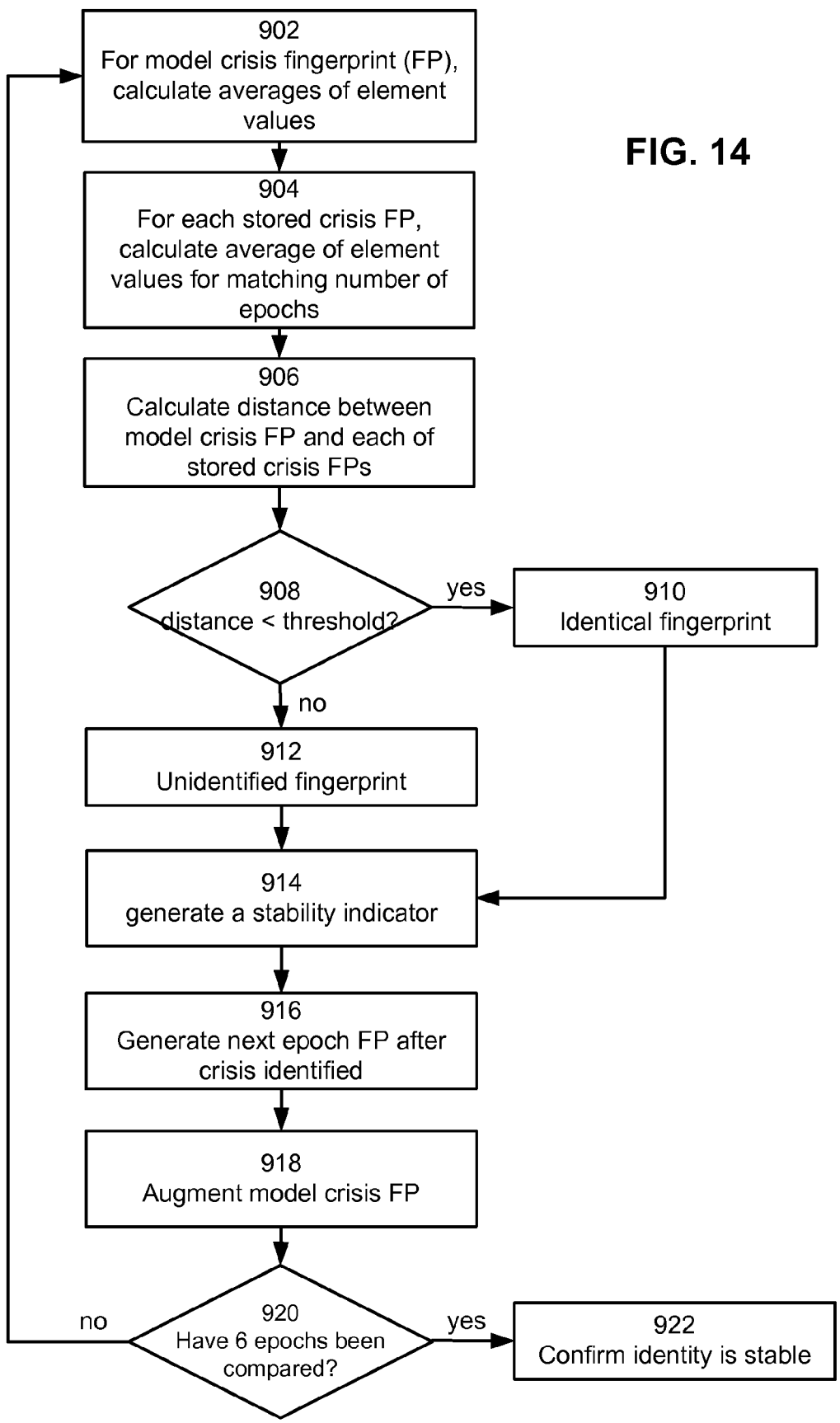
FIG. 14 depicts a flow chart of exemplary steps of identifying whether a crisis has previously occurred.

At step 354, the technology attempts to match the crisis fingerprint generated at step 352 with a crisis fingerprint stored in the database 112. FIG. 14 provides additional detail of matching a crisis fingerprint with a fingerprint stored in the database 112. If the technology favorably matches the crisis fingerprint with a fingerprint stored in the database 112, the technology delivers a repair alarm to the operator (via the signal collector 50), at step 356. If the technology does not match the crisis fingerprint with a fingerprint stored in the database 112, the technology delivers a diagnose alarm to the operator (via the signal collector 50), at step 358. At step 360, the technology adds the generated crisis fingerprint to the database 112.

Figures 9, 10:
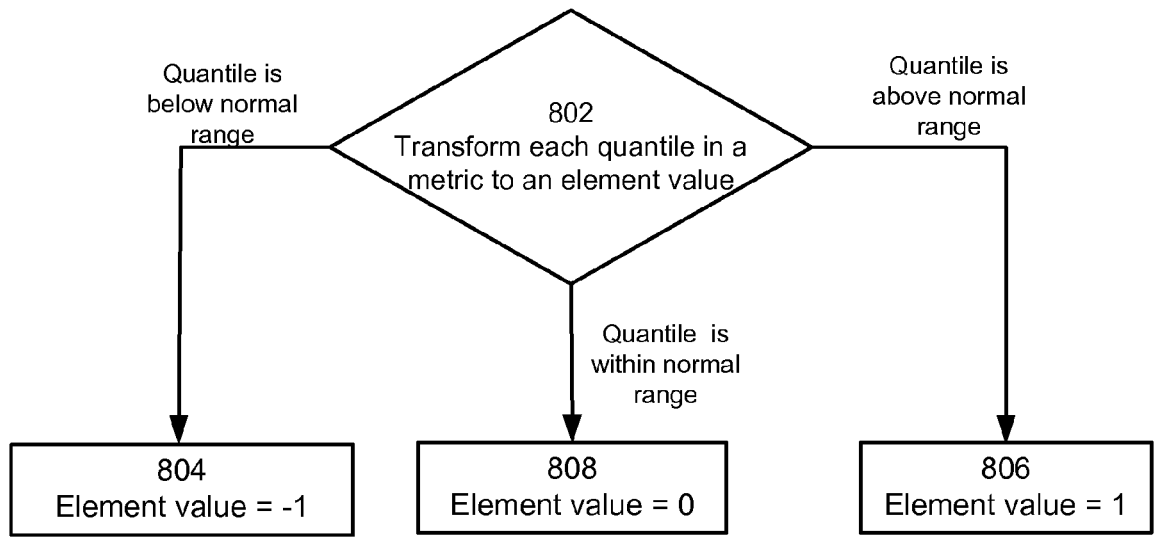
FIG. 9 depicts a flow chart of exemplary steps of assigning element values to each quantile in a summary vector.
FIG. 10 depicts exemplary summary vectors with elements values.

FIGS. 7-9 provide additional detail of step 308. In order to transform each quantile into a hot, cold or normal element value, the technology tracks the historical performance of each quantile and uses the historical performance of each quantile to determine a "normal" range of each quantile in a signal. FIG. 7 illustrates exemplary steps for calculating this normal range of each quantile, which can be performed asynchronously with other steps described herein. Using the exemplary datacenter above, a summary vector includes three quantiles per signal. Thus, the technology determines a "normal" range for each of the 300 quantiles in each summary vector. In some embodiments, the technology designates a quantile as "normal" if its value is between the $2^{nd}$ and $98^{th}$ percentile of the quantiles observed during a contiguous period of time T in which no crisis was identified. In other words, the technology expects that 4% of the time, the quantiles of a signal will be outside the normal range even though no performance crisis is in progress (e.g., 4% false positive rate).

To calculate hot and cold thresholds for a quantile within a signal, the technology selects a period of time T, at step 602. In some embodiments, the technology samples the summary vectors generated during the past thirty days, and uses these summary vectors to calculate a normal range. The period T may be any period of time. The technology may also update the normal range of a quantile at any interval. For example, the technology may only sample the summary vectors every thirty days and adjust the normal range of each quantile accordingly. At step 604, the technology identifies the summary vectors generated during the period of time T that are not associated with a performance crisis (e.g., based on KPIs).

At step 606, the technology calculates, for each quantile in the summary vector, the 98% value over the period of time T, and sets the 98% value as a hot threshold. The technology also calculates the 2% value for each quantile over the period of time T, and sets the 2% value as a cold threshold. Quantiles that fall between the 2% value and 98% value are considered "normal" values.

It is also within the scope of the technology to designate the abnormally high and low values of a quantile in other ways. By way of example only, a normal range of a quantile may be calculated by calculating the 2nd and 98th quantile values as described in FIG. 5. The 2nd and 98th quantile values may be calculated for each summary vector.

FIG. 8 illustrates another embodiment for updating the hot and cold thresholds. In this embodiment, the hot and cold thresholds are updated every time a summary vector is generated. At step 650, the technology generates a summary vector for an epoch. At step 652, the technology determines if the generated summary vector is associated with a performance crisis (according to the KPIs). If the generated summary vector is associated with a performance crisis, the technology does not use the quantiles in the summary vector to adjust or update the hot/cold thresholds, at step 654. If the summary vector is not associated with a performance crisis, the technology adds each quantile from the summary vector to the historical performance of quantiles used to calculate the normal range for that specific quantile, and recalculates the hot threshold (>98%) and cold threshold (<2%) for the quantile. Thus, while the datacenter is in operation, the hot and cold thresholds are updated in real-time.

In another embodiment, the hot/cold thresholds are calculated using statistical time series modeling techniques (both parametric and nonparametric) to fit an empirical model to the quantile. A standard deviation may then be computed (again using standard statistical modeling techniques) and the hot and cold thresholds may be established by values that are a number of standard deviations away from the predicted value by the model. In one embodiment, the technology used four standard deviations as determining the hot and cold thresholds. Other numbers of standard deviations may be used.

FIG. 9 illustrates exemplary steps for transforming each quantile in a signal into a hot element value, a cold element value or a normal element value. At step 802, the technology transforms each quantile in the summary vector into an element value based on its historical performance. If a quantile is below its historically cold threshold, the technology transforms the quantile to an element value of −1, at step 804. If a quantile is above its hot threshold, the technology transforms the quantile to an element value of 1, at step 806. If a quantile is between the historically hot and cold thresholds, the technology transforms the quantile to an element value of 0, at step 808. FIG. 10 illustrates an exemplary summary vector containing three element values per signal, for each of the 100 signals.

FIGS. 11-12 illustrate exemplary steps for determining the subset of relevant or key signals (out of the 100) that are most relevant for identifying a performance crisis. The technology determines which signals are relevant in two steps. The technology first selects signals that correlate well with the occurrence of each individual crisis by performing feature selection and classification on data surrounding each performance crisis. Second, the technology identifies the subset of relevant signals as the signals most frequently selected in the feature selection and classification process.

Feature selection and classification is a technique from statistical machine learning that first induces a function between a set of features (signals) and a class (crisis or no crisis) and concurrently tries to find a small subset of the available features that yields an accurate function. For example, let $X_{m,t}$ be the vector of signals collected on computer resource m at time t and $Y_{m,t}$ be 0 if the performance of m was normal and 1 if it was anomalous, as specified by the performance SLAs. A classifier is a function that predicts the performance state of a computer resource Y given the collected signals X as input. The feature selection component picks a subset of X that still renders this prediction accurate. In some embodiments, the technology uses logistic regression with L1regularization as the statistical machine learning method. Other statistical machine learning methods may include Naïve Bayes and support vector machines. Regularized logistic regression augments the maximization in the statistical fitting of the logistic regression with a constraint on the parameters of the model. The constraint is that the sum of the parameters be bounded, which in turn forces irrelevant parameters to go to zero, effectively performing feature selection.

Key metrics are metrics within a model that are most indicative of the SLO state of the model. The key metrics are identified by computing a relevance score for each signal in the model and then ordering the signals according to relevance in decreasing order. In one embodiment, the relevance score is a probability that a single signal is indicative of the state of the datacenter. In other embodiments, the relevance score is a probability that a group of metrics are indicative of the state of the datacenter. In some embodiments, the relevance score of a single signal or of a group of signals is also a probability that the metric or group of metrics indicate a root cause of a performance crisis.

In some embodiments, a relevance score is determined for each signal from a perspective of mathematical equations. In one equation view, let $\overline{M}$ denote a vector of signals M. Let S be a variable representing a state value, which in the technology described herein, can have two states from the set {1,0} or the set {s+, s−}. These states in each set represent, respectively, compliance (no crisis) or violation of an SLO (crisis). To find the relevance score to allow for selection of key metrics in a model, the subset $\overline{M}^*$ of M is found, the subset $\overline{M}^*$ constituting the key indicators of S. This approach is based on the assumption that this is equivalent to the issue of feature selection in a pattern classification context. The pattern classification issue includes finding the function F that maps $\overline{M}$ to S. The resulting function F has a score that determines how good this function is. It is customary to use "Classification Accuracy," namely the probability that given an instance of the values of the metrics the function will correctly identify the state S (crisis or no crisis). In one embodiment, a balanced accuracy may be used to evaluate the quality of the mapping F.

For the second step, in which the technology selects the most frequent signals, the technology analyzes a population of twenty past performance crises (referred to as a "training set"). This training set of past performance crises may change over time as new performance crises are detected. In some embodiments, the technology uses a training set of twenty performance crises. For each function F, the technology selects a subset of the twenty performance crises from the training set. Any number of the performance crises in the training set may be selected. The technology counts how many times each signal appears, sorts them and selects the top thirty performance crises.

FIG. 12 illustrates six exemplary epoch fingerprints, each designated by their epoch T1, T2, T3, T4, T5 and T6. Each epoch fingerprint includes three element values per signal for each of the thirty relevant metrics determined in FIG. 11. For the purpose of describing the technology herein only, a performance crisis is identified during epoch T3.

FIG. 13 provides additional detail of step 352 in FIG. 4. Using the example whereby each epoch is 15 minutes and a crisis fingerprint consists of six epoch fingerprints, the technology does not wait to capture all six epoch fingerprints to begin the matching process. Instead, the technology begins the step of matching a crisis fingerprint against the crisis fingerprints stored in the database 112 immediately upon detecting a performance crisis.

At step 880, the technology identifies the epoch fingerprint associated with the beginning of a performance crisis. Using the example provided in FIG. 12, the technology identifies the epoch fingerprint associated with epoch T3. At step 882, the technology obtains the two epoch fingerprints prior to the occurrence of the performance crisis, epoch fingerprint of T1 and epoch fingerprint of T2. At step 884, the technology augments the crisis fingerprint consisting of the two epoch fingerprints T1, T2. This crisis fingerprint represents the state of the computer resources in the datacenter 30 minutes prior to the beginning of the performance crisis. This crisis fingerprint is exemplary, and is not intended to limit the scope of the technology described herein. In some embodiments, a crisis fingerprint generated upon detecting a performance crisis may consist of only one epoch fingerprints prior to the crisis or more than two epoch fingerprints prior to the crisis.

The analysis engine 110 determines whether the crisis fingerprint favorably matches any of the crisis fingerprints stored in the database 112 (step 882) and each time the crisis fingerprint is augmented. If the generated crisis fingerprint favorably matches any of the fingerprints in the database 112, the system 100 recognizes that the performance crisis associated with the fingerprint has previously occurred.

FIG. 14 provides additional detail of how the technology determines whether a performance crisis has previously occurred in the datacenter. In the FIG. 14 embodiment, an average of each crisis fingerprint is calculated and compared to each crisis fingerprint stored in the database 112 to determine if the generated crisis fingerprint favorably matches any of the crisis fingerprints stored in the database 112.

At step 902, the technology, using the crisis fingerprint, calculates an average of each element value in each of the 30 signals. Using the epoch fingerprints shown in FIG. 12, a crisis fingerprint consisting of three consecutive epochs fingerprints during T1, T2 and T3, the average of the three epoch fingerprints is {2/3 2/3 0, 2/3 2/3 0, 0 0 0, 2/3 2/3 0, . . . 1/3 2/3 2/3} (three epochs (T1, T2, T3) in the crisis fingerprint and the column sums are 2, 2, 0, 2, 2, 0, 0, 0, 0, 0, 0, 0, 2, 2, 0 . . . 1, 2, 2). As a result, the crisis fingerprint is represented as a vector including three average values per signal, after step 902.

At step 904, the technology calculates an average of each element value in each of the 30 signals for each of the crisis fingerprints stored in the database 112 using the first 3 epoch fingerprints in each crisis fingerprint. As discussed above, each crisis fingerprint stored in the database consists of six consecutive epoch fingerprints.

At step 906, the technology calculates the distance between the crisis fingerprint (of average values) and each of the crisis fingerprints (of average values) stored in the database 112. In some embodiments, the technology calculates an L2 distance between the crisis fingerprint vector and each of the crisis fingerprints stored in the database 112. The L2distance is referred to as a similarity score between the corresponding fingerprints. Calculating an L2 distance between two vectors is known to one of ordinary skill in the art and therefore, additional disclosure is not required herein. In other embodiments, the technology calculates a Hamming distance between the crisis fingerprint and each of the crisis fingerprints stored in the database 112. The Hamming distance between two strings of equal length is the number of positions for which the corresponding symbols are different. One of ordinary skill in the art understands how to calculate the Hamming distance and therefore, additional description is not required herein.

At step 908, the technology determines if the calculated distance (e.g., L2, hamming, etc.) is less than a predetermined identification threshold. If the distance between the crisis fingerprint and a crisis fingerprint stored in the database 112 is less than the identification threshold, the technology considers the two fingerprints identical, at step 910. If the distance between the crisis fingerprint and a crisis fingerprint stored in the database 112 is greater than the identification threshold, the technology considers the two fingerprints dissimilar, at step 912.

At step 914, the technology generates a stability indicator associated with each matching result (identical/dissimilar). A crisis fingerprints typically lasts longer than a single epoch. Thus, the technology augments the crisis fingerprint with additional epoch fingerprints while the crisis is ongoing and performs identification during each epoch. Using an example whereby a crisis fingerprint consists of six consecutive epoch fingerprints and the initial crisis fingerprint consists of two epoch fingerprints prior to the crisis occurring, the technology will eventually perform five identifications; starting when the performance crisis is detected and continuing for four subsequent epochs into the performance crisis (1 hour into the performance crisis).

For each identification, the technology generates a stability indicator (e.g., a label x for "unknown"). An stability sequence consisting of five indicators is considered stable if it consists of zero or more consecutive x's followed by zero or more consecutive identical labels. For example, if A and B are labels of known prior performance crises, the sequences xxAAA, BBBB, and xxxxx are all stable, whereas xxAxA, xxAAB, and AAAAB are all unstable. At this point, the stability sequence associated with each crisis fingerprint stored in the database 112 contains a single label.

At step 916, the technology, after the next 15 minute interval, generated the next epoch fingerprint. Using the FIG. 12, the technology generates the epoch fingerprint during T3. At step 918, the technology augments the crisis fingerprint with the epoch fingerprint of T3. Thus, the crisis fingerprint now consists of the epoch fingerprints T1, T2 and T3. At step 920, the technology determines if a crisis fingerprint consisting of six epoch fingerprints has been compared against the crisis fingerprints stored in the database 112. At this point only three epoch fingerprints of the crisis fingerprints have been compared. Thus, the technology returns to step 902.

Steps 902-918 are repeated, each time comparing the average of the crisis fingerprint to the average of each stored crisis fingerprint for the same number of epochs. Steps 902-918 are repeated until the crisis fingerprint consists of six consecutive epoch fingerprints (1 hour into the performance crisis) and the average of the six epoch fingerprints have been compared to each of the crisis fingerprints stored in the database 112 (each also consisting of six consecutive epoch fingerprints). Of course, this is assuming that a crisis fingerprint consists of six consecutive epoch fingerprints. In other embodiment, a complete crisis fingerprint consists of four epoch fingerprints prior to the crisis and four epoch fingerprints during the crisis. Thus, steps 902-918 are repeated until the complete crisis fingerprint is compared against the crisis fingerprints stored in the database 112.

At step 922, the technology confirms that the stability sequence generated at step 914 is stable. If the stability sequence is stable, the technology evaluates whether the identification is accurate and measures time to identification as the time of the first epoch after the start of the performance crisis during which the correct label was emitted. When identifying a performance crisis that has previously occurred, the known accuracy is the probability of correctly labeling the performance crisis using a stable identification sequence. If the stability sequence is not stable, the technology does not recognize the matched crisis fingerprint as representing a crisis. If the new crisis fingerprint could not be identified, an unknown accuracy is the probability of correctly labeling the performance crisis as "unknown" in all four identification epochs.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for automatically identifying a crisis type occurring in a system having a plurality of computer resources, comprising;
   summarizing a plurality of signals collected from each computer resource in the system during an epoch, wherein summarizing the plurality of signals includes generating a summary vector having at least one quantile per signal across the plurality of signals collected from each computer resource;
   generating an epoch fingerprint based on summarizing the plurality of signals collected from each computer resource in the system during the epoch,
   upon detecting a performance crisis within the system, generating a crisis fingerprint including at least one epoch fingerprint;
   comparing the generated crisis fingerprint against one or more crisis fingerprints stored in a database; and
   identifying a crisis type associated with the performance crisis detected within the system based on a favorable match between the generated crisis fingerprint and one of the crisis fingerprints stored in the database.

2. The method as recited in claim 1, wherein summarizing a plurality of signals collected from each computer resource in the system comprises:
   transforming the at least one quantile per signal to an element value associated with one of the following values: abnormally low, abnormally high, or normal.

3. The method as recited in claim 2, wherein transforming the at least one quantile per signal to an element value comprises:
   determining a historical performance of the at least one quantile for each signal; and
   transforming the at least one quantile per signal to the element value based on the historical performance of the at least one quantile.

4. The method as recited in claim 3, wherein determining a historical performance of the at least one quantile for each signal comprises:
   tracking historical values of the at least one quantile for each signal while the performance crisis is not occurring within the system;

calculating an abnormally low quantile value of the at least one quantile for each signal;

calculating an abnormally high quantile value of the at least one quantile for each signal; and designating a normal quantile value for each signal between the calculated abnormally low quantile value and the calculated abnormally high quantile value.

5. The method as recited in claim 1, wherein generating an epoch fingerprint comprises:

selecting a subset of the plurality of signals collected from each computer resource in the system during the epoch, the subset of signals associated with signals most relevant to the performance crisis; and generating the epoch fingerprint based on the subset of signals.

6. The method as recited in claim 5, wherein selecting a subset of the plurality of signals comprises:

automatically inducing a statistical model of a relationship between the plurality of signals and a crisis state of the system.

7. The method as recited in claim 6, wherein the statistical model is a logistic regression with L1 regularization.

8. The method as recited in claim 1, wherein the generated crisis fingerprint includes a set of epoch fingerprints with at least one epoch fingerprint taking place before the start of the performance crisis, and at least one epoch fingerprint taking place after the start of the performance crisis, and wherein comparing and identifying the crisis type associated with the performance crisis detected within the system with respect to the one or more crisis fingerprints stored in the database comprises:

comparing the at least one epoch fingerprint taking place before the start of the performance crisis to the crisis fingerprints in the database as soon as the performance crisis is detected within the system;

continue adding one or more epoch fingerprints to the generated crisis fingerprint for comparison to the crisis fingerprints in the database until a positive identification or an assurance that the crisis type associated with the performance crisis detected within the system is a new type of crisis.

9. The method as recited in claim 8, wherein a number of epoch fingerprints included in the generated crisis fingerprint and occurring before the performance crisis is equal to or less than two, and wherein a number of epoch fingerprints included in the generated crisis fingerprint and occurring after the performance crisis is equal to or less than four.

10. The method as recited in claim 8, wherein identifying a crisis type comprises:

summarizing values over the set of epoch fingerprints in the generated crisis fingerprint and computing a distance norm between the generated crises fingerprint and each crisis fingerprint stored in the database or calculating a hamming distance between the generated crises fingerprint and each crisis fingerprint stored in the database; and identifying the favorable match between the generated crisis fingerprint and one of the crisis fingerprints stored in the database if the calculated hamming distance or the distance norm is within an identification threshold.

11. A method for forecasting a performance crisis occurring in a system having a plurality of computer resources, and identifying a crisis type associated with the performance crisis comprising:

generating a summary vector for each epoch that signals are collected from each computer resource in the system, the summary vector including at least one quantile per signal across the signals collected from each computer resource in the system;

generating an epoch fingerprint for each epoch that the signals are collected from each computer resource in the system, each epoch fingerprint representing a summary of a state of the computer resources during the epoch across a subset of the signals collected;

upon identifying a first performance crisis in the system, generating a first crisis fingerprint including at least one epoch fingerprint associated with an epoch prior to the occurrence of the first performance crisis;

storing the first crisis fingerprint in a database;

upon identifying a second performance crisis in the system, generating a second crisis fingerprint including at least a first epoch fingerprint associated with a first epoch prior to the occurrence of the second performance crisis;

determining that the second performance crisis is a recurrence of the first performance crisis based on a favorable match between the second crisis fingerprint and the first crisis fingerprint; and predicting that the first performance crisis may recur again in the system upon identifying at least one newly generated epoch fingerprint that favorably matches the first crisis fingerprint.

12. The method as recited in claim 11, wherein generating an epoch fingerprint for each epoch comprises:

selecting a subset of the signals collected from each computer resource in the system, the subset of the signals associated with signals most relevant for identifying the performance crisis; and generating an epoch fingerprint based on the selected subset of the signals.

13. The method as recited in claim 12, further comprising:

transforming the at least one quantile per signal to an element value associated with one of the following values: abnormally low, abnormally high, or normal.

14. The method as recited in claim 11, wherein determining that the second performance crisis is a recurrence of the first performance crisis comprises the step of:

summarizing values over epoch fingerprints included in the second crisis fingerprint and computing an distance norm between the first crisis fingerprint and the second crisis fingerprint or calculating a hamming distance between the first crises fingerprint and the second crisis fingerprint; and identifying a favorable match between the second crisis fingerprint and the first crisis fingerprint if the calculated hamming distance or the distance norm is within an identification threshold.

15. The method as recited in claim 11, further comprising the step of:

storing the at least one newly generated epoch fingerprint that favorably matches the first crisis fingerprint in the database as a predictive fingerprint.

16. The method as recited in claim 14, further including the step of:

generating a confidence measure associated with the favorable match.

17. A method for automatically identifying a performance crisis type occurring in a system having a plurality of computer resources, comprising:

generating an epoch fingerprint for each period of time that signals are collected from the computer resources in the system;

upon detecting a performance crisis in the system, generating a crisis fingerprint including at least one epoch fingerprint generated prior to occurrence of the performance crisis;

comparing the generated crisis fingerprint against one or more model crisis fingerprints stored in a database;

augmenting the generated crisis fingerprint with at least one epoch fingerprint generated after the occurrence of the performance crisis such that the generated crisis fingerprint includes the at least one epoch fingerprint generated after the occurrence of the performance crisis;

comparing the augmented crisis fingerprint against one or more model crisis fingerprints stored in a database; and identifying that the performance crisis associated with the augmented crisis fingerprint has previously occurred in the system based on favorably matching the augmented crisis fingerprint with a model crisis fingerprint stored in the database.

18. The method as recited in claim 17, wherein the performance crisis is detected in the system based on at least twenty-percent of the computer resources in the system being in violation of a service level agreement threshold during a single period of time.

19. The method as recited in claim 17, further comprising the steps of:

generating a confidence measure associated with a favorable match.

20. The method as recited in claim 17, further comprising the steps of:

generating a repair alarm upon favorably matching the augmented crisis fingerprint with a model crisis fingerprint stored in the database; and delivering the repair alarm to an operator.

* * * * *